March 17, 1959
G. PUDERBAUGH ET AL
2,877,503
METHOD OF FORMING PLASTIC AERODYNAMIC CUFFS
Filed April 15, 1954
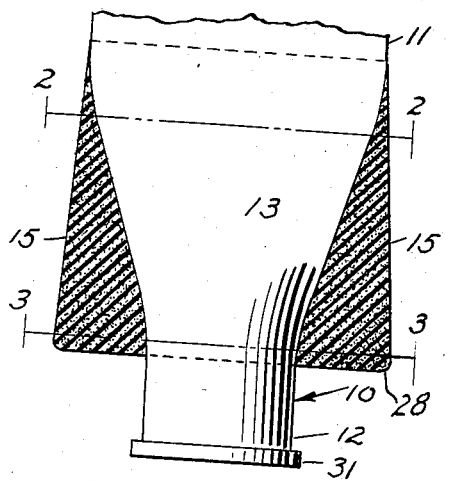
Fig. 1
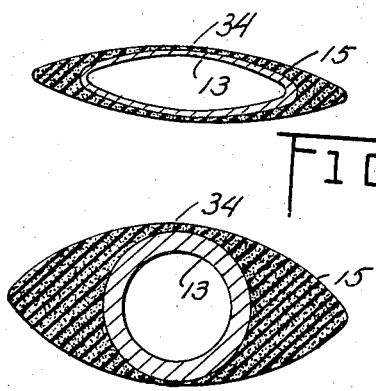
Fig. 2
Fig. 3
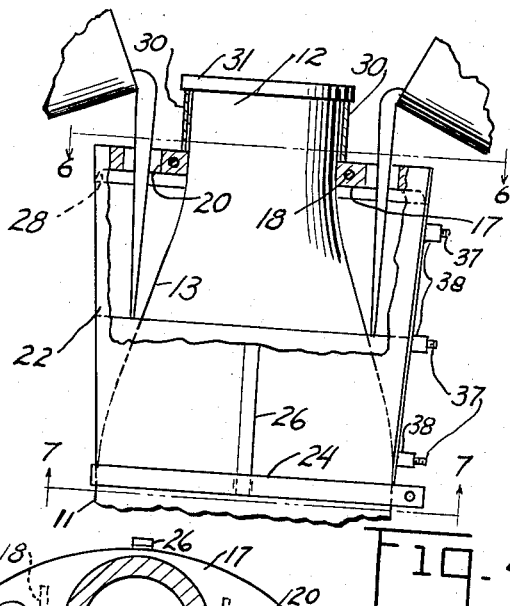
Fig. 4
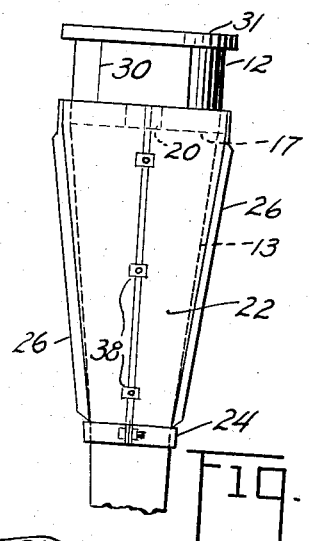
Fig. 5
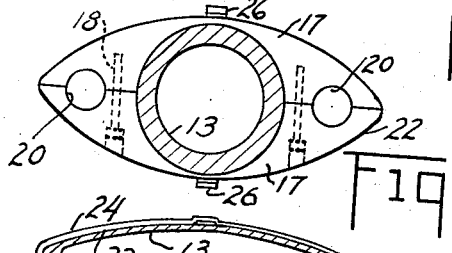
Fig. 6
Fig. 7
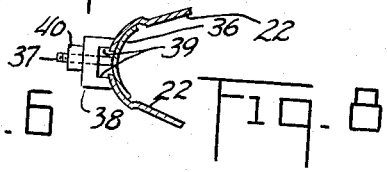
Fig. 8
INVENTORS
GEORGE PUDERBAUGH + EDWIN F. MITTENZWEI
BY
*Godfrey B. Spein*
ATTORNEY United States Patent Office 2,877,503
Patented Mar. 17, 1959

2,877,503
METHOD OF FORMING PLASTIC AERODYNAMIC CUFFS

George Puderbaugh, Mountain View, and Edwin F. Mittenzwei, North Caldwell, N. J., assignors to Curtiss-Wright Corporation, a corporation of Delaware Application April 15, 1954, Serial No. 423,480

1 Claim. (Cl. 18—59)

This invention relates to improvement in the blades of aeronautical propellers, and is concerned particularly with the combination of metal and plastic materials of certain kinds, to produce a blade having superior aerodynamic and weight characteristics. The prior art shows metallic propeller blades equipped with aerodynamic cuffs of various types. Most of the cuffs shown comprise sheet metal fairings of aerodynamic form which are secured to the shank or inner end of the propeller blade by suitable securing means. Due to the vibration condition under which a propeller blade operates, these sheet metal cuffs have been found rather undesirable, since they are likely to develop cracks and to fail in service. Also, the construction and the finish of these cuffs is rather difficult and leaves much to be desired. In the present invention, we set out to produce cuffs on propeller blades which are formed in place and are bonded to the surfaces of the propeller blades so that the plastic cuff becomes a more or less integral part of the blade structure. We provide a novel way in which the cuffs are formed on the propeller blade and we also utilize materials which are peculiarly well adapted for the purpose intended.

In the plastics industry, there have been many products which have a wide range of utility. Some of these have been considered for use in cuffs and the most of them have been found wanting. However, in recent years, a new family of plastic materials has been developed for purposes which have not yet been fully exploited. These materials are generally known as isocyanates. It appears that the isocyanate plastic materials may be adjusted and reacted to produce a rather wide range of solid or foamed bodies having a wide range of physical characteristics. For the purpose of propeller blade cuffs, we choose to use a foamed-in-place plastic material which when completed has a density in the range of 15 to 25 pounds per cubic foot.

This material, while light in weight, has considerable strength. It has the further favorable characteristics of bonding very effectively to the steel or metal surfaces around which it is cast, and also has the property, when cast, of forming a rather non-porous skin on the outer surface. This cuff material naturally has lower physical properties than the metal propeller blade upon which it is cast. Sometimes, when a propeller blade equipped with the isocyanate cuff is operated, damage may be inflicted on the blade or on the cuff, or both. In such a case, the propeller blade requires servicing and the plastic cuff may be stripped from the blade if it is damaged, without damaging the metal propeller blade. Upon renovation of the propeller blade, a suitable mold may be assembled on the propeller blade, and a new isocyanate cuff may be cast thereon. This rework may readily be accomplished in a well-equipped overhaul shop. The cuff components, which are liquid in form, may be supplied as kits, and relatively inexperienced personnel may prepare the cuff material and cast the cuff, with good assurance of securing a final cuff product which is serviceable and satisfactory.

The selected range of isocyanate plastic materials have characteristics of considerable strength, lightness and resilience, while still having sufficient physical integrity to withstand the service conditions to which they are exposed. As a detailed description of the invention proceeds, it will become apparent that the plastic material may be cast in place to provide a filler for hollow propeller blades, or to provide fairings either at the leading or trailing edge of propeller blades, in addition to using the material to form, specifically, the type of propeller blade cuff which is shown in the drawings.

Some of the features of the invention are shown in the attached drawings in which similar reference characters designate similar parts and in which:

Fig. 1 is a side elevation of a propeller blade showing the blade proper and the cuff in assembled relation on the blade.

Fig. 2 is a section on line 2—2 of Fig. 1.

Fig. 3 is a section on the line 3—3 of Fig. 1.

Fig. 4 is a side elevation of a part of a propeller blade, inverted, and having a mold assembled thereon, the figure further showing the pouring of a propeller blade cuff into the mold.

Fig. 5 is a view similar to Fig. 4 in end elevation.

Fig. 6 is a view on the line 6—6 of Fig. 4.

Fig. 7 is a view on the line 7—7 of Fig. 4.

Fig. 8 is a fragmentary section showing an assembly of part of the mold for the cuff.

Referring to Figs. 1, 2 and 3, we show a propeller blade 10 having an outer airfoil section 11, an inner cylindrical flanged butt portion 12, and a tapered transition portion 13 which blends the cylindrical butt 12 into the airfoil portion 11. In normal operation of the propeller blade, the portion 13 is exposed in the airstream and clearly, due to its non streamlined form, creates considerable drag in the rotation of the propeller. Accordingly, it is most desirable to equip this portion of the propeller blade with a streamlined fairing in order to reduce the drag thereof and to cause this portion of the blade to contribute to the lift or propulsive effect of the propeller. To this end, we equip the shank portion of the propeller blade with a streamlined fairing 15. As mentioned previously, fairings of this general sort have been shown in the prior art but not, to our knowledge, of materials such as we propose herein which are bonded as an integral part of the propeller blade and yet, which are expendable in the sense that, when they are damaged, they may be removed and replaced.

As indicated previously, we form the cuff 15 from a plastic material. Several special liquids are required, which are mixed together and are poured into an appropriate form. Liquid I comprises a pre-prolymer. This in the preferred arrangement is mixed with two catalysts. The resulting liquid is poured into a mold assembled on the propeller blade as will now be described.

Reference may now be made to Figs. 4-7. In Figs. 4 and 5 the blade is shown with its butt pointed upwardly. A mold end plate 17 comprises two halves as shown in Fig. 6, which are assembled around the butt of the blade and are secured to one another as by screws 18. The end plate halves are provided with a central opening fitting around the blade butt. The outer edge of the end plate 17 is profiled to a streamlined configuration such as is desired in the final cuff. Two filling openings 20 are formed through the end plate 17 through which the plastic mixture will ultimately be poured, one over each of the major cavities in the mold. A flexible mold sheet, of metal or other material, 22 is wrapped around the assembled mold end plate 17 and is also wrapped snugly around the blade airfoil portion 11. At this latter location, as shown in Fig. 7, it is preferred to wrap a reinforcing strip 24, of considerable thickness, around the lower edge of the mold sheet to assure complete contact of the mold sheet with the blade surface where they engage one another. Thus, leakage of molding material when poured into the mold cavity is avoided, and also, the cuff will be formed with a thin edge which feathers nicely into the blade surface with no interruption or protuberances. The upper end of the mold sheet 22 is secured to the mold end plate 17 by any suitable means. Such means might comprise screwing the mold sheet to the end plate, or wrapping a binding strip around the mold sheet to hold it in close engagement with the end plate. Prior to assembly of the mold components, the inner surface of the mold sheet 22 and the surfaces of the mold end plate 17 are coated with some parting compound such as wax. When the mold is completed, and the cuff poured and cured, the mold sheet and the mold end plate can then be stripped from the cuff without damaging the surface of the cuff. The blade shank itself is kept very clean so good bonding will be afforded between the molding material and the surface of the propeller blade.

As shown in Fig. 5 it may be desired to secure reinforcing bars 26, externally of the mold sheet 22, longitudinally of the mold sheet portions whose curvature is not acute. This will prevent the mold sheet from bulging during the molding operation and due to the slight pressure which is exerted by the molding material as it blows to secure porosity, and cures.

When the mold assembly is completed, the liquid molding mixture is poured in two batches, each into the mold through one of the two filler openings 20 in the mold end plate 17. The reaction of the molding components starts within a few moments of pouring the material into the mold. This reaction consists in the mixture warming up, and the release of minute bubbles of carbon-dioxide throughout the molding mass. These minute bubbles blow up the liquid as it is starting to cure and sufficient material is put into the mold so that it will overflow from the mold cavity through the filler openings 20 due to the blowing. The slight pressure exerted by the two concurrently poured batches of molding material during the blowing cycle assures the filling of all crevices in the mold and causes the mold material to intimately contact all inner surfaces of the mold cavity.

In order to avoid sharp edges on the final molded articles, it may be desired to provide fillets as noted at 28 around the edge of the inner surface of the molds and the plate 17. These fillets blend into the mold sheet 22 so that a rounded edge will finally be formed at the inner edge or upper edge as shown in Fig. 4 of the molded cuff. In order to standardize the location of cuffs on a large number of blades upon which cuffs are formed, it may be desirable to dispose split spacer rings 30 between the flanges 31 on the blade butts and the outer or exposed surface of the end plates 17 forming parts of the molds.

The mold material takes only a few moments to blow and fill the mold but an appreciable period of time such as two or three hours is required for the mold material to set firmly to the point where the molding elements such as 22 and 17 may be safely removed. After the mold elements are removed, the flash and any irregularities on the molded article may be trimmed off. Then the mold is allower to set and develop full strength which may take several days.

It may be noted in Figs. 1–3 that the preferred form of cuff 15 fully embraces the blade shank 13. That is, part of the molding material covers the flatter portions of the blade shank as at 35, so that plastic material is disposed all around the metal of the propeller blade. These portions at 34 are preferably rather thin, about 1/16 to 1/8 of an inch, so that the thickness of the blade section is increased to an insignificant degree. Control of the thickness of the portions 34 is afforded by the reinforcing bars 26 shown in Fig. 5. These are dimensioned and located to allow a small spacing between the mold sheet 22 and the side portions of the blade shank 13.

In Fig. 8 we show an arrangement for securing the edge of the mold sheet 22 so that it may be adjusted to conform accurately, upon mold assembly, to the blade and to the desired cuff configuration. The edges of this sheet 22 do not quite come together and between these edges is disposed a fairly firm leading edge strip 36, which extends longitudinally from the end palte 17 to the airfoil portion 11 of the propeller blade. The member 36 is provided with a plurality of studs 37 extending in an outward direction. Over these studs are placed a plurality of yokes 38 whose edges 39 engage the edges of the mold sheet 22 and clamp them against the member 36. The yokes 38 are secured in clamping relations by suitable nuts or the like as shown at 40.

There are undoubtedly a considerable number of combinations of isocyanate and other reaction agents which may be reacted to produce blade cuffs and the like which are suitable for aeronautical use. The following table gives an example of one successful mixture of isocyanate material and other agents by which the isocyanate is blown and cured:

| | | |
|---|---|---|
| Pre-polymer | 1. Toluene diisocyanate 100 pts./wt. 2. Castor Oil 85 pts./wt. 3. Polyethylene glycol 15 pts./wt. 4. Polyethylene glycol 4 pts./wt. | 100 pts./wt. (grams) 12 pts./wt. (grams) |
| Catalyst A | 5. Glycerine 98% 8 pts./wt. | |
| Catalyst B | 6. Diethylcyclohexylamine | 2 c.c. |

Notes: Minor density variations in product are made by varying water content of agent #5, glycerine. Also, reduction in amount of agent #4 reduces product density. Increase in amount of agent 6 increases speed of reaction.

In using the three mixtures in the above tabulation, all of which are in liquid form, they are thoroughly mixed together and then are promptly poured into the mold cavity. The three component liquids, by themselves, have a fairly indefinite shelf life and will not change in their characteristics. Once they are mixed, however, they must be handled promptly and poured into the mold. Otherwise, the reaction will occur prior to pouring in the mold and the material will be spoiled. It is not believed necessary here to outline the precise chemical reactions which occur between these various materials. However, in general, catalyst A acts largely as a blowing agent and also contributes to the curing of the plastic material. Catalyst B serves largely to cure the material and to produce heat to accelerate the curing.

The exemplary formulation tabulated above produces a blown plastic material whose density is substantially 18 lbs. per cubic foot. Variations may be made in this density by varying the amount of water in formula component No. 5, and also in varying the amount of component No. 4.

A variation in the technique of cuff fabrication which may be practiced with the other phases of the invention already described, is to coat the propeller blade, before the mold is assembled around it, with isocyanate formulations which create a solid, dense film which adheres to the metallic portions of the propeller blade. Then, when the exemplary formulation outlined is poured into the mold, the formulation adheres to the film of solid plastic and bonds firmly thereto. The thin layer of solid plastic between the blown material and the metal blade provides for stress distribution to strengthen the assembly.

Though one embodiment of the invention is shown, it is to be understood that the invention may be used in various forms and in various environments. Changes may be made in the arrangements shown without departing from the spirit of the invention. The appended claim defines the limits of the invention.

What we claim is:

The method of forming an aerodynamic cuff on the tapered shank of a metallic propeller blade, the cuff having an elongated streamlined cross section and the blade shank tapering from a substantially circular cross-section to an elongated streamlined cross section, which consists in disposing the blade with its butt end up, assembling and securing a cuff mold around the blade shank, the lower end of the mold engaging the blade surface at the lower end of the shank, the mold including an upper end plate defining the cuff end near the upper end of the shank and the end plate having two pouring openings, one over part of the mold cavity between one edge of the cuff mold and blade shank and the other over part of the mold cavity between the other edge of the cuff mold and blade shank, the mold parts between said cavities lying in closely spaced relation to the shank surface, substantially concurrently preparing two batches of uncured, quick-setting liquid plastic mixed with blowing and curing reactants, pouring one batch into the mold through one opening and substantially concurrently pouring the other batch into the mold through the other opening, so that the material of the two batches in the mold will pass concurrently into the space between the mold and shank surfaces to there intermix in the liquid state prior to final setting of the batches, and leaving the two batches to blow and cure simultaneously in the mold, parts of the batches bonding to each other at their margins.

References Cited in the file of this patent

UNITED STATES PATENTS

| | | |
|---|---|---|
| 2,199,144 | Tegarty | Apr. 30, 1940 |
| 2,276,262 | Caldwell et al. | Mar. 10, 1942 |
| 2,382,199 | Brink | Aug. 14, 1945 |
| 2,470,089 | Booth | May 17, 1949 |
| 2,566,701 | Griese | Sept. 4, 1951 |
| 2,620,516 | Muller | Dec. 9, 1952 |
| 2,623,599 | Kearsn | Dec. 30, 1952 |
| 2,642,920 | Simon et al. | June 23, 1953 |

FOREIGN PATENTS

| | | |
|---|---|---|
| 550,305 | Great Britain | Jan. 1, 1943 |

OTHER REFERENCES

"Foamed Plastics," British Plastics, December 1947 (pages 528–536). (Copy in Division 15.)